United States Patent

[11] 3,580,056

| [72] | Inventor | Robert F. Warner<br>Coldwater, Mich. |
|---|---|---|
| [21] | Appl. No. | 674,798 |
| [22] | Filed | Oct. 12, 1967 |
| [45] | Patented | May 25, 1971 |
| [73] | Assignee | Hayes Albion Corporation<br>Jackson, Mich. |

[54] NONDESTRUCTIVE, RESONANT TESTING APPARATUS WITH MAGNETIC PICKUP
3 Claims, 2 Drawing Figs.

[52] U.S. Cl........................................ 73/67.2,
324/37
[51] Int. Cl.................................... G01h 13/00
[50] Field of Search............................73/67, 67.1,
67.2, 71.4; 324/34 (Position), (Displacement),
(Eccentricity), (Inquired)

[56] References Cited
UNITED STATES PATENTS
2,754,678   7/1956   Stinger ........................ 73/71.4

| 3,003,628 | 10/1961 | Diamond et al. ............ | 73/67.2UX |
| 3,019,387 | 1/1962 | Rowe ........................... | 73/67.2X |
| 3,292,426 | 12/1966 | McCann....................... | 73/71.4 |

FOREIGN PATENTS

| 1,373,720 | 8/1964 | France ........................ | 73/67.2 |
| 710,969 | 6/1965 | Canada ....................... | 324/34 |

Primary Examiner—Richard C. Queisser
Assistant Examiner—John P. Beauchamp
Attorney—Barnes, Kisselle, Raisch & Choate ABSTRACT: A casting under test is placed in a magnetic field and struck with a hammer causing the casting to vibrate at its resonant frequency. There is a pickup coil disposed in the field to sense variations thereof caused by vibration of the casting. The pickup coil develops a test signal whose frequency and amplitude represent the vibration of a casting. The test signal is processed via a frequency discrimination circuit and a decay rate detection circuit to ascertain when the vibration frequency and the vibration decay rate are acceptable.

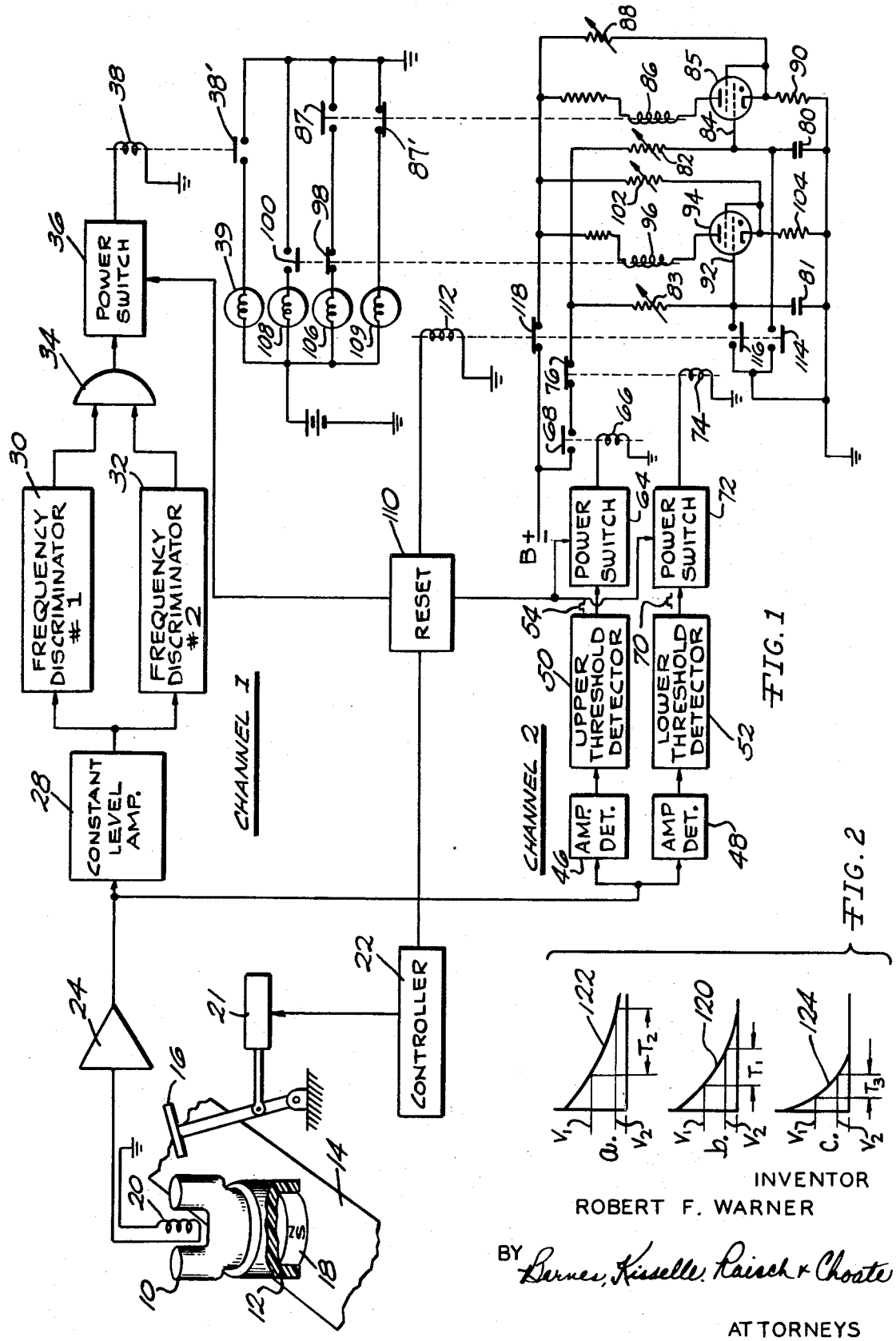

NONDESTRUCTIVE, RESONANT TESTING APPARATUS WITH MAGNETIC PICKUP

This invention relates to nondestructive resonant testing apparatus wherein vibration of a workpiece is measured to determine faults in the workpiece and more particularly to an improvement in such testing apparatus using a magnetic field and a magnetic pickup coil to sense vibration of the workpiece.

The soundness of a casting can be tested by striking the casting with a hammer or the like and listening to the tone produced as the casting vibrates. The ringing tone of the casting can also be analyzed by electronic circuitry to detect deviations in the vibration of the casting as compared to vibration of an acceptable standard casting. Very useful testing of castings can be achieved by detecting the resonant vibration frequency of the casting and the rate at which vibration of the casting decays. However, testing based on audible tones have serious drawbacks when used in a foundry or other production facilities where the ambient noise level is high. The test signal developed by an audio pickup device such as a microphone may have a very low signal-to-noise ratio which leads to unreliable testing results.

The objects of the present invention are to provide a nondestructive, resonant testing apparatus which is insensitive to ambient noise; which provides reliable test results in practical testing applications conducted in a high ambient noise environment; and which provides more reliable test results by comparison to prior art sonic testing without additional cost.

Other objects, features and advantages of the present invention will become apparent in connection with the following description, the appended claims and the accompanying drawings in which:

FIG. 1 is a circuit diagram, partly in block form and partly in schematic form, of a resonant testing instrument for testing castings; and FIG. 2 shows the envelopes of three test signals having different decay times.

Referring to FIG. 1, a casting 10 rests on a suitable holder 12 mounted on a conveyor 14 (shown in part) which moves the casting through a test station at which the casting 10 is struck by a hammer 16 to set the casting into vibration. The holder 12 is constructed of nonmagnetic material, such as nylon and a permanent magnet 18 is mounted in the lower portion of holder 12 so that casting 10 is disposed in the magnetic field associated with magnet 18. The construction of holder 12 may be suitably modified, depending on the size, shape and weight of the casting under test, to retain the casting without interfering with vibration of the casting when it is struck by hammer 16. A pickup coil 20 is disposed generally above casting 10 and coupled to the field of magnet 18. For castings having the particular yoke shape illustrated, the pickup coil 20 is disposed to project down between the arms of the yoke. Hammer 16 is operated by a suitable actuator 21 controlled by a controller circuit 22. The circuit 22 is of conventional construction to correlate the operation of hammer 16 and the test cycle of the testing apparatus with the motion of conveyor 14.

When casting 10 is set into vibration by hammer 16, the magnetic coupling between magnet 18 and coil 20 varies in accordance with the vibration of casting 10, and coil 20 develops a test signal whose frequency and amplitude of the vibration in the casting. The test signal from coil 20 is amplified at 24 and fed to a first channel, Channel 1, and to a second channel, Channel 2. Channel 1 detects deviations in the vibration frequency of casting 10 from the vibration frequency of an acceptable casting. Channel 2 measures the rate at which the vibration of casting 10 decays and detects deviations from the decay rate of an acceptable casting.

More particularly, in Channel 1 the test signal from amplifier 24 is applied to a constant level amplifier 28 which limits the test signal so that its amplitude is constant at all frequencies. The constant amplitude test signal from amplifier 28 is then fed to a pair of frequency discriminators 30, 32. Discriminator 30 is constructed to pass the test signal only when its frequency is below an upper frequency limit, $f_1$. Discriminator 32 is constructed to pass the test signal only when the frequency of the test signal is above a predetermined lower frequency limit, $f_2$. The upper frequency limit, $f_1$, and the lower frequency limit, $f_2$, are selected so that the range from $f_1$ to $f_2$ corresponds to the vibration frequency of an acceptable casting within allowable tolerances. The test signals passed by discriminators 30, 32 operate a coincidence gate circuit 34 which in turn actuates a power switch 36 that energizes a relay 38 having normally open contacts 38'. Thus if the frequency of the test signal is within the acceptable limits, $f_1$—$f_2$, contacts 38' close to energize a lamp 39 indicating that casting 10 is acceptable based on its vibration frequency.

In Channel 2 the test signal is fed to a pair of envelope detectors 46, 48 which in turn are connected to upper and lower threshold detectors 50, 52, respectively. Detector 50 has its threshold selected to provide an output timing pulse 54 when the amplitude of the test signal decays to a first predetermined value, $V_1$. The timing pulse 54 from detector 50 actuates a power switch 64 to energize a relay 66 and close its normally open contacts 68. Detector 52 has its threshold selected to generate a timing pulse 70 when the amplitude of the test signal decays to lower predetermined value, $V_2$. The timing pulse 70 actuates a power switch 72 which in turn energizes a relay 74 to open its normally closed contacts 76. Contacts 68, 76 are connected in the charging circuit of a pair of timing capacitors 80, 81. The charging circuit for capacitor 80 is from B+ through contacts 68, 76, an adjustable resistor 82 and capacitor 80 to ground. The charging circuit for capacitor 81 is from B+ through contacts 68, 76, an adjustable resistor 83 and capacitor 81 to ground. Capacitor 80 is also connected to a control grid 84 of a thyratron 85 which in turn controls a relay 86 having normally open contacts 87 and normally closed contacts 87'. Thyratron 85 has a biasing circuit including a variable resistor 88 and a cathode resistor 90 so that the grid voltage required to fire thyratron 85 can be selected by varying resistor 88. Capacitor 81 is also connected to the grid 92 of a thyratron 94 which in turn controls a relay 96 having normally closed contacts 98 and normally open contacts 100. Thyratron 94 also has a biasing circuit comprising an adjustable resistor 102 and a cathode resistor 104 so that the grid voltage required to fire thyratron 94 can be selected.

As will later be apparent resistors 88, 82 are adjusted so that if the interval between timing pulses 54, 70 is at least as great as the minimum interval for an acceptable casting, capacitor 80 will charge to a value sufficient to fire thyratron 85. Resistors 83, 102 are adjusted so that if the interval between timing pulses 54, 70 is longer than the maximum interval for an acceptable casting capacitor 81 will charge to a voltage sufficient to fire thyratron 94. Contacts 87, 98 are connected in series with a lamp 106 which indicates an acceptable casting. Contacts 100 are connected in series with a lamp 108 which indicates an unacceptable casting having a long decay time. Contacts 87' are connected in series with a lamp 109 which indicates a short decay time.

Controller 22 also operates a suitable reset circuit 110 upon the completion of a test cycle. The reset circuit opens power switches 36, 64 and 72 and energizes a relay 112 having normally open contacts 114, 116 and normally closed contacts 118 to discharge capacitors 80, 81, and open the plate circuits of thyratrons 85, 94. Suitable sorting devices (not shown) may also be provided to reject castings in a conventional manner upon failing to obtain an acceptable indication from either Channel 1 or Channel 2.

To summarize the operation of the testing apparatus described hereinabove, when actuator 21 is operated causing hammer 16 to strike casting 10, the field of magnet 18 will vary in accordance with the resonant vibration of the casting. Coil 20 senses the magnetic field variations and develops a test signal whose frequency and amplitude correspond to the frequency and amplitude of the vibrations in casting 10. The test signal as shaped by amplifier 28 is passed by the combined action of discriminators 30, 32 only if the frequency of the test signal is within a very narrow band corresponding to acceptable variations in the resonant frequency of a good casting. If the resonant frequency of casting 10 is within the acceptable limits, relay 38 is energized to light lamp 39. As the vibration of the casting decays, the test signal amplitude will decay in the manner of a damped oscillatory waveform. The envelope of the damped test signal is detected by detectors 46, 48 and fed to the upper and lower threshold detector circuits 50, 52. When the signal decays to the threshold of detector 50, designated $V_1$ in FIGS. 2 a—c, detector 50 generates the timing pulse 54 which initiates charging of the timing capacitors 80, 81 via the closed contacts 76. When the test signal decays to the threshold of detector 52, designated $V_2$ in FIGS. 2 a—c, detector 52 provides pulse 70 to open contact 76 and terminate charging of capacitors 80, 81.

The upper threshold $V_1$ of detector 50 and the lower threshold $V_2$ of detector 52 are selected so that for an acceptable casting, the test signal designated 120 in FIG. 2b will decay from $V_1$ to $V_2$ over a time interval $T_1$. With test signal 120 capacitor 80 will charge to a voltage sufficient to fire thyratron 85 closing contacts 87, but capacitor 81 will not be charged sufficiently to fire thyratron 94. Hence lamp 106 will be lighted at the end of a test cycle. If the decay time exceeds the time $T_1$ beyond an acceptable tolerance as illustrated by the test signal 122 and the time $T_2$ in FIG. 2a, capacitor 81 will charge to a value sufficient to fire thyratron 94 preventing a good indication at the lamp 106 and providing an over indication at lamp 108 at the end of a test cycle. If the decay time is too short as illustrated by the test signal 124 and the time $T_3$ (FIG. 2c), contact 76 will open before the charge on capacitor 80 is sufficient to fire thyratron 85, preventing a good indication at lamp 106 and providing an under indication at lamp 109 at the end of a test cycle. As previously mentioned, a suitable sorting device (not shown) may be provided to reject unacceptable castings.

I claim:

1. A nondestructive, resonant testing apparatus for detecting faults in castings and the like comprising means for striking a casting to induce vibration thereof, vibration sensing means responsive to vibration of said casting to develop an electrical test signal having frequency and amplitude variations representing the vibration of said casting, frequency discrimination circuit means operatively coupled to said sensing means and responsive to said test signal to develop a first output signal when said test signal has a predetermined frequency within a predetermined frequency range, decay rate detection circuit means operatively coupled to said vibration sensing means to provide a second output signal when the time required for said test signal to decay from a first amplitude to a second amplitude is within predetermined limits, and output circuit means responsive to said output signals to indicate a fault in a casting in response to predetermined deviations in either one of said signals, and wherein said sensing means comprises means producing a magnetic field and pickup means to sense variations in said field and develop said test signal so that when said casting is operatively associated with said field and said pickup means, vibrations induced in said casting cause said field and said test signal to vary in accordance with vibration of said casting, and wherein said decay rate direction circuit means comprises means responsive to said test signal to provide a first timing pulse when said test signal decays to said first amplitude and a second timing pulse when said test signal decays to said second amplitude, first circuit means including a first capacitor, second circuit means including a second capacitor and third circuit means responsive to said first timing pulse and said second timing pulse to vary the charge on said first and said second capacitors in accordance with the time required for said test signal to decay from said first amplitude to said second amplitude, one of said capacitor circuit means being responsive to the charge on its capacitor to indicate when said decay time of said test signal is within said predetermined limits, and the other of said capacitor circuit means being responsive to the charge on its capacitor to indicate when said decay time of said test signal is outside at least one of said predetermined limits.

2. A nondestructive testing apparatus to detect flaws in a casting wherein testing is performed in an environment such as a foundry or the like having a relatively high ambient sonic noise level comprising a test station, a conveyor movable through said test station, holder means mounted on said conveyor to accommodate a casting thereon for movement through said test station, magnet means having north and south poles to establish a magnetic field, said magnet means being mounted on said conveyor so that a casting on said holder means is disposed above said magnet means and in said magnetic field, striker means located at said test station and adapted to strike said casting to set said casting into vibration and coil means located at said test station and coupled to said field so as to respond to variations in said field when said casting vibrates to provide an output signal whose amplitude and frequency represent vibration of said casting.

3. An apparatus for detecting flaws in a workpiece such as a casting or the like comprising means for generating a magnetic field, magnetic field sensing means mounted in spaced relation to said magnetic field generating means and operatively coupled to said field to develop a test signal in response to variations in said field, said generating means and said sensing means being arranged to receive said casting in the space therebetween with said casting disposed in said field, means for striking said casting to cause said casting to vibrate and to thereby cause said magnetic field to vary in accordance with vibration of said casting and develop in said sensing means a test signal whose frequency and amplitude represent vibration of said casting, and output circuit means responsive to said test signal and operative to detect deviations in said test signal from a corresponding test signal representing vibration of an acceptable casting, and wherein said striking means and said magnetic field sensing means are disposed at a test station and wherein said apparatus further comprises a conveyor movable through said test station and holder means mounted on said conveyor to accommodate a workpiece thereon, said magnetic field generating means comprising a permanent magnet having north and south poles with said magnet being incorporated in said holder means on said conveyor below said workpiece with said poles of said magnet oriented so as to establish said field through said casting.